(12) United States Patent
Leblond et al.

(10) Patent No.: US 7,849,996 B2
(45) Date of Patent: Dec. 14, 2010

(54) DEVICE FOR LOADING OR UNLOADING CONTAINERS COMPRISING A NECK ON A TRANSPORTING ELEMENT

(75) Inventors: Regis Leblond, Octeville sur Mer (FR); Denis Gillet, Octeville sur Mer (FR)

(73) Assignee: Sidel Participations, Octeville-sur-Mer (FR)

( * ) Notice: Subject to any disclaimer, the term of this patent is extended or adjusted under 35 U.S.C. 154(b) by 401 days.

(21) Appl. No.: 12/063,035

(22) PCT Filed: Aug. 22, 2006

(86) PCT No.: PCT/EP2006/065555

§ 371 (c)(1),
(2), (4) Date: May 14, 2008

(87) PCT Pub. No.: WO2007/025909

PCT Pub. Date: Mar. 8, 2007

(65) Prior Publication Data

US 2010/0159060 A1     Jun. 24, 2010

(30) Foreign Application Priority Data

Aug. 29, 2005   (FR) .................................... 0552590

(51) Int. Cl.
*B29C 49/64* (2006.01)
(52) U.S. Cl. ............... 198/605; 198/377.07; 198/459.2; 198/465.4; 198/478.1
(58) Field of Classification Search ..............................
198/377.07–377.09, 459.2, 449–450, 678.1, 198/469.1, 605
See application file for complete search history.

(56) References Cited

U.S. PATENT DOCUMENTS

| 3,400,815 | A | * | 9/1968 | Bell et al. .................... 209/531 |
| 3,432,033 | A | * | 3/1969 | Everett ....................... 209/560 |
| 3,637,074 | A | | 1/1972 | Banyas et al. |
| 3,944,058 | A | * | 3/1976 | Strauss .................. 198/377.07 |
| 6,488,449 | B1 | * | 12/2002 | Laquay et al. ................ 406/88 |
| 7,104,390 | B2 | * | 9/2006 | Hiramoto et al. ......... 198/480.1 |

(Continued)

FOREIGN PATENT DOCUMENTS

JP        2004-276372 A     10/2004

(Continued)

*Primary Examiner*—Mark A Deuble
(74) *Attorney, Agent, or Firm*—Young & Thompson

(57) ABSTRACT

The invention concerns a device for loading (10) or unloading (58) preforms (12) comprising a neck (20) on a transporting element (14) which includes a device (28) for individually gripping one preform (12) by its neck, the loading or unloading device comprising: means for dispensing (32, 42) preforms which include means for individually receiving (42) each preform, the trajectory of the receiving means and the trajectory of the gripping means, in planar projection, being tangent in at least one intersecting point (P3, P4) wherein the preform (12) being in a gripping position, the neck (20) of the preform (12) is vertically arranged opposite the gripping member; means for synchronizing the movement of the receiving means relative to the movement of the gripping member. The invention is characterized in that the trajectory of the receiving means and the trajectory of the gripping member are superimposed along at least one intersecting line (P3-P1, P2-P4).

13 Claims, 3 Drawing Sheets

U.S. PATENT DOCUMENTS

| | | | |
|---|---|---|---|
| 7,681,713 B2 * | 3/2010 | Nishi et al. | 198/470.1 |
| 7,743,907 B2 * | 6/2010 | Weinbrenner et al. | 198/459.2 |
| 2003/0173186 A1 * | 9/2003 | Hiramoto et al. | 198/377.07 |
| 2009/0057099 A1 * | 3/2009 | Preti et al. | 198/459.2 |

FOREIGN PATENT DOCUMENTS

| | | |
|---|---|---|
| JP | 2004-299350 A | 10/2004 |
| WO | 2006/010141 A2 | 1/2006 |

* cited by examiner

DEVICE FOR LOADING OR UNLOADING CONTAINERS COMPRISING A NECK ON A TRANSPORTING ELEMENT

The invention relates to a device for loading or unloading containers that include a neck onto a transporting element.

The invention relates more particularly to a device for loading or unloading containers comprising a neck, and in particular preforms made of thermoplastic material, onto a transporting element which comprises at least one individual member for grasping a preform by its neck, and which is able to transport the preform along a horizontal transport path, the loading or unloading device comprising:

means of distributing preforms which comprise means of individually receiving each preform so as to successively lead each preform along a distribution path so that the path of the reception means and the path of the grasping members, in planar projection, are tangential at at least one point of intersection in which the preform occupies a grasping position in which the neck of the preform is positioned vertically with respect to the grasping member, means for synchronizing the movement of the reception means relative to the movement of the grasping member so that the grasping member is able to catch or release the neck of the preform by vertically sliding the preform to the grasping position relative to the grasping member in an operation to grasp or release the preform occurring at said at least one point of intersection of the above-mentioned paths.

The present invention relates to refinements made to devices for loading containers or preforms having a neck, notably bottles, onto a transporting element which is equipped with individual members for grasping containers by their neck. These grasping members are spaced apart from each other by a predetermined pitch and the containers are brought to the loading device one after the other spaced apart by the predetermined pitch.

These loading devices are in particular suited to container production and/or filling installations. Thus, in container production installations, preforms are transported by such a transporting element through a preheating oven before the duly heated preforms are transformed into containers by a blow-molding operation.

In this type of installation, the routing of the preforms to the transporting element is commonly handled by transfer wheels, of which numerous embodiments are known.

The preforms are loaded onto the element in a grasping operation, during which the mandrel is forced into the neck of the preform that the transfer wheels support.

Moreover, in the ovens for heating the thermoplastic material that constitutes the preforms, which are used in the container production installations, the transfer of the preforms can be handled by notched plates or clamps which catch the preforms and bring them under the moving mandrels.

Installations of this type are already known, notably through document EP-A-0.573.352.

In these known installations, the path of the mandrels in planar projection is tangential at a single point of intersection with the path of the preforms carried by the transfer wheel.

The rotationwise driving of the transfer wheel and the straight-line driving of the grasping members are synchronized so that a grasping member and a preform carried by the transfer wheel present themselves in synchronism at the point of intersection, vertically in line with one another. At this single point of intersection, the grasping operation is performed. The lowering of the mandrel previously raised to the cancelled position and the fitting of it into the neck of the underlying preform are controlled, for example, by a cam system.

However, the grasping operation must be performed very quickly because the preforms cross the path of the mandrels at only a single point. Such a grasping operation is not suitable for the loading device operating at high speed. In practice, the faster the transporting element, the more quickly the grasping operation must be carried out. However, at high rate, the mandrel is likely to be inadequately fitted into the neck of the preform. The preform then risks falling from the mandrel.

To solve this problem, the invention proposes a more reliable and less costly loading device which is characterized in that the path of the reception means and the path of the grasping members in planar projection are superimposed and synchronized along at least one line of intersection so that the preform is held in its grasping position all along the line of intersection.

According to other characteristics of the invention:
the grasping members are mounted to slide vertically relative to the preform between a top grasping position and a bottom transfer position;
the preform reception means are mounted to slide vertically so as to slide the preforms between a bottom transfer position in which the preform is released from the grasping member and a top grasping position in which the preform is caught by the grasping member;
the loading or unloading device comprises means of controlling the sliding of the reception means relative to the grasping member so that the sliding of the reception means relative to the associated grasping member from one position to the other is performed progressively all along the line of intersection;
the path of the grasping members along the line of intersection is circular about a driving vertical rotation axis, the reception means being positioned at the periphery of a rotating plate, the rotation axis of which corresponds to said driving vertical rotation axis;
the transporting element is an endless chain, a curved portion of which is wound around a drive wheel, the plate being formed by the drive wheel;
the reception means are clamps which can catch the container by its neck by elastically and reversibly fitting the preform into the clamp;
the loading device comprises ejection means comprising means for selectively controlling the operation to release preforms that are incorrectly held relative to the grasping member, the incorrectly held preforms being selectively released from the grasp of the grasping member on a downstream section of the line of intersection by being held by the reception means;
the ejection means comprise means for dropping the incorrectly held preforms which are in the bottom transfer position after the releasing operation;
the ejection means comprise an arm which is inserted into the path of the neck of the preforms in the bottom transfer position after the releasing operation.

Other characteristics and advantages will become apparent while reading the detailed description that follows, for an understanding of which the reader should refer to the appended drawings in which.

In the description hereinbelow, a longitudinal, vertical and transversal orientation indicated by the trihedron L,V,T of FIG. 1 will be used in a non-limiting way.

Hereinafter, identical, analogous or similar elements will be designated by the same reference numbers.

Figure 1:
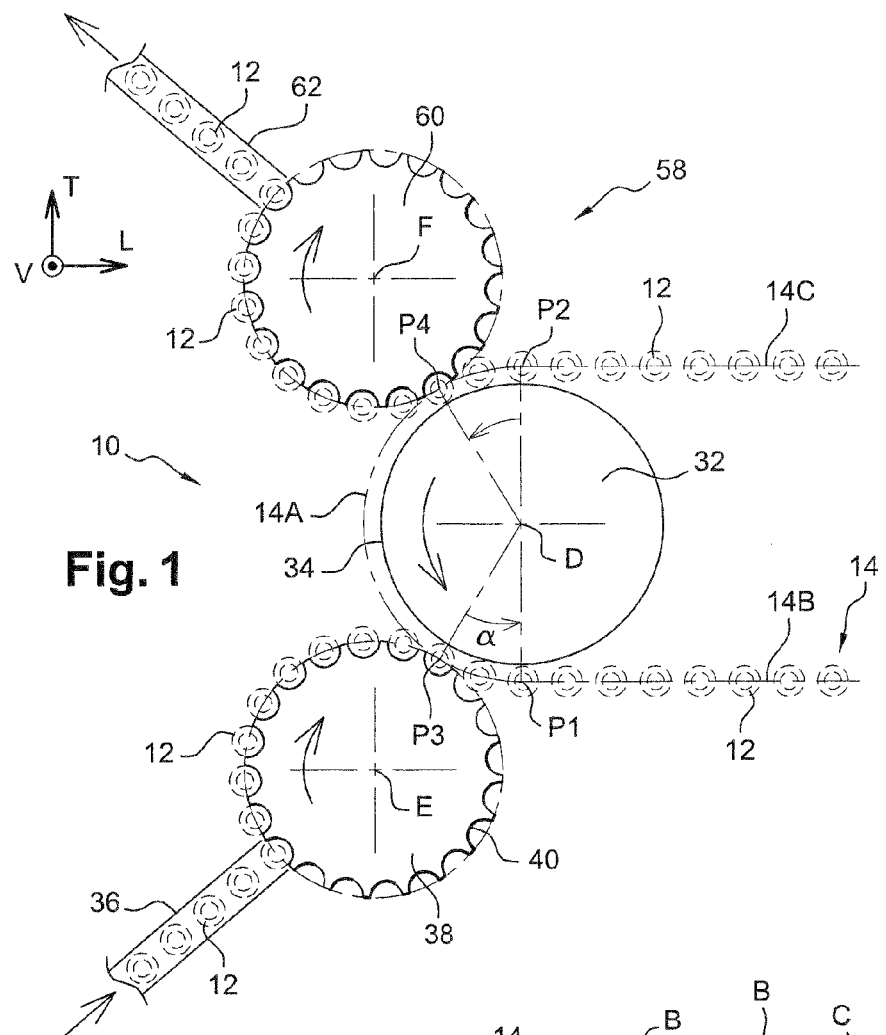
FIG. 1 is a plan view which represents a loading and unloading device which is produced according to the teachings of the invention.

FIG. 1 represents a device 10 for loading containers 12 onto a transporting element 14.

The containers 12 are in this case preforms which are made of a thermoplastic material, such as polyethylene terephthalate (PET), and which are intended to be transformed into containers, such as bottles, after a first heating operation to soften the constituent thermoplastic, than a second blow-molding or stretch blow-molding operation, to shape the preform 12 into a container.

Figure 2:
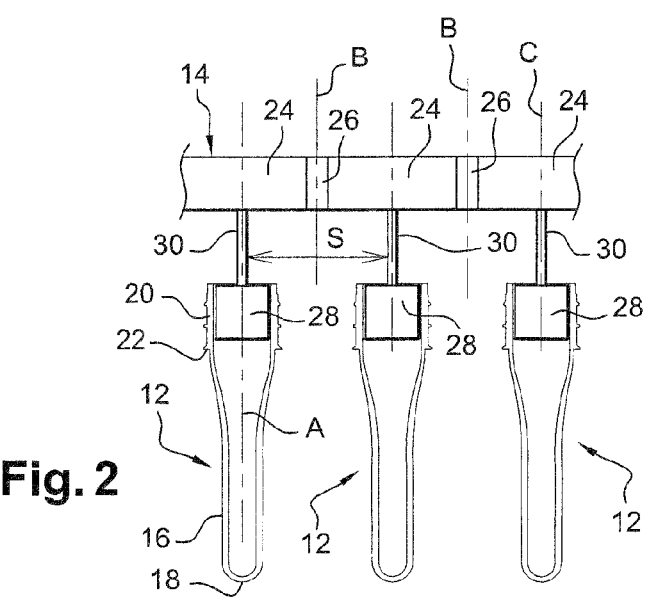
FIG. 2 is a larger-scale side view which represents preforms which are caught by mandrels carried by a transport chain.

In a known way, each preform 12 has the form of a test piece or test tube of vertical axis "A". As represented in FIG. 2, the tubular body 16 of the preform 12 is closed at its bottom and by a hemispherical bottom 18 whereas its top end has a neck 20 which forms the neck of the final container.

The junction between the tubular body 16 and the neck 20 is delimited by a collar 22 which extends horizontally projecting externally. The external cylindrical face 20 of the neck in this case comprises a screwthread which is intended to receive a threaded top (not represented) in order to seal the container.

The element 14 for transporting the preforms 12 is in this case a flexible element such as an endless transport chain which forms a closed loop extending in a horizontal plane. As represented in FIG. 2, the transport chain 14 comprises a plurality of links 24 which are hinged relative to each other by hinges 26 of vertical axis "B".

The transporting element 14 comprises a plurality of grasping members 28 which are in this case mandrels. Each mandrel 28 is carried by a link 24 of the transport chain 14. The mandrels 28 are spaced apart by a predetermined pitch "S" which in this case corresponds to the distance between the hinges 26 of a link 24.

Each mandrel 28 is more particularly carried by a rod 30, also called spinner, of vertical axis "C" which extends vertically downward from the middle of a bottom face of the link 24.

The bottom end of each rod 30 carries the mandrel 28 which comprises a plurality of jaws (not represented) which move radially relative to the axis "C" of the mandrel between a retracted position in which the mandrel 28 is able to be inserted inside the neck 20 of a preform 12, and an expanded position in which the jaws are able to exert a radial pressure against the internal cylindrical wall of the neck 20 of the preform 12 in order for the preform 12 to be secured by friction to the mandrel 28. The jaws are elastically returned to their expanded position.

Thus, in an operation for grasping the preform 12 by the mandrel 28, the mandrel 28 is inserted by force vertically inside the neck 20 of the preform 12 by vertical sliding relative to the mandrel 28 in relation to the preform 12, which provokes a retraction of the jaws against the elastic return force.

Figure 4:
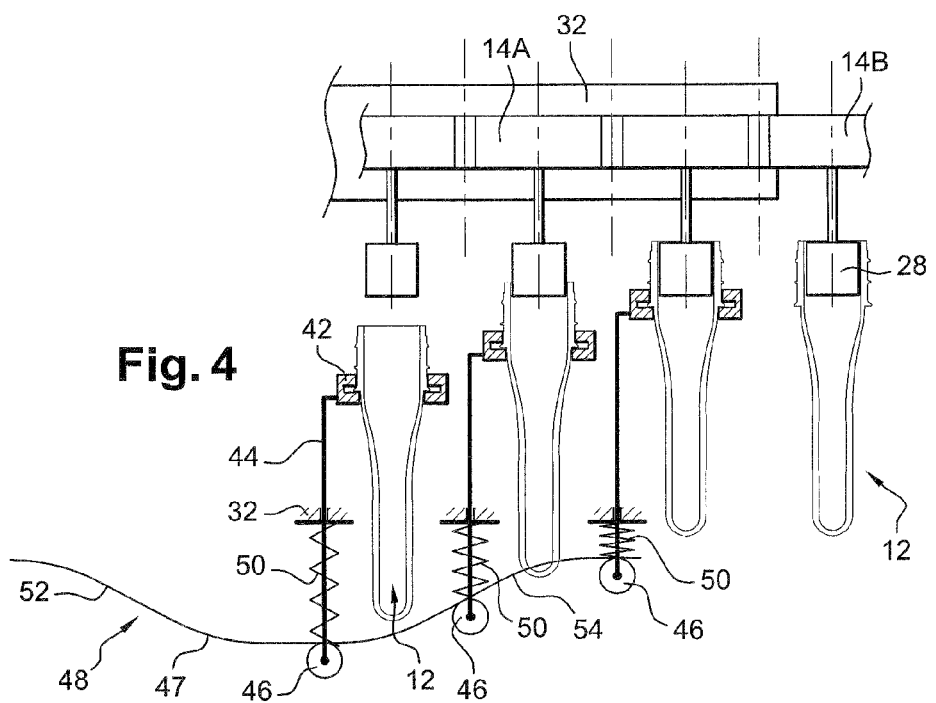
FIG. 4 is a diagrammatic side view which represents preforms during the grasping operation by the mandrels.
Figure 5:
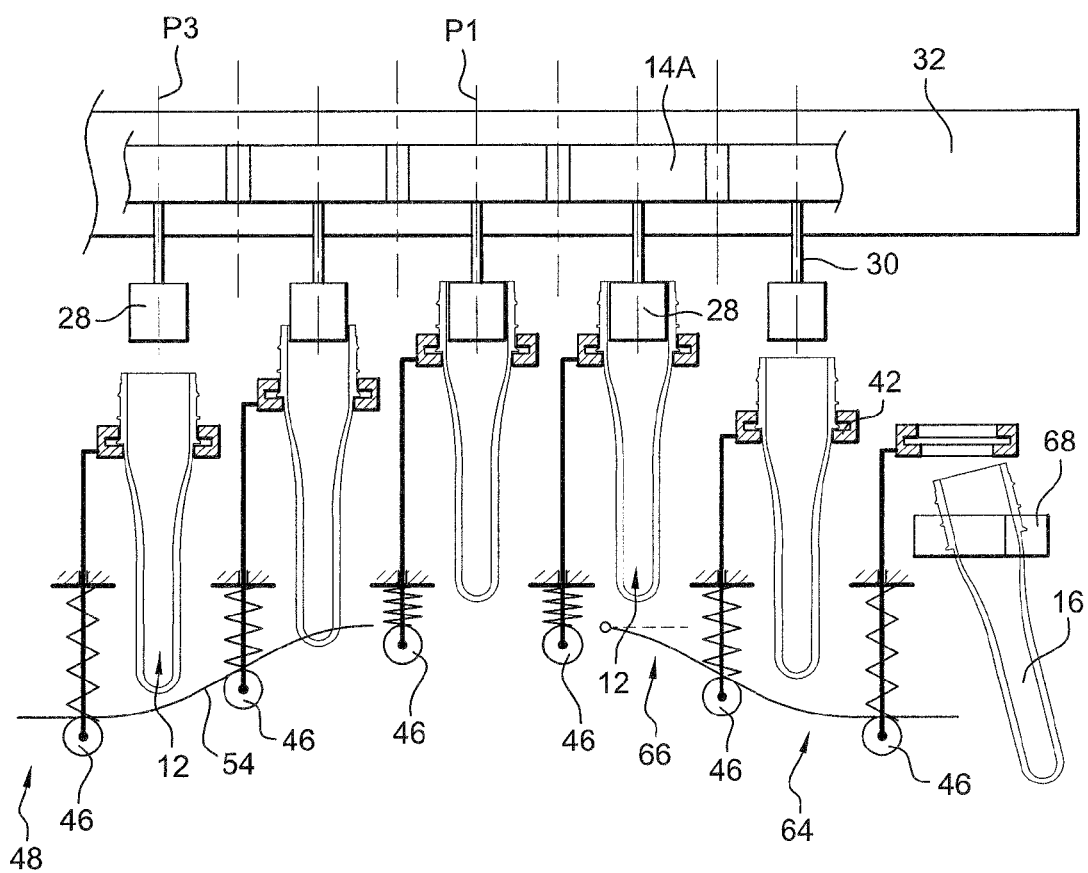
FIG. 5 is a view similar to that of FIG. 4 which represents the path of a preform which is incorrectly held by a mandrel.

In the embodiment represented in FIGS. 2, 4 and 5, the rod 30 is mounted to rotate about its axis "C" relative to the link 24 in order to be able to rotate the preform 12 on itself about the axis "C" when it is transported by the transport chain 14.

As represented in FIG. 1, the transport chain 14 is in this case driven rotationwise or at least guided rotationwise, by a drive wheel 32. The drive wheel 32 is mounted to rotate about its vertical central axis "D" and it is driven rotationwise in an anticlockwise direction with reference to FIG. 1.

A curved portion 14A of the transport chain 14 is wound around a peripheral rim portion 34 of the drive wheel 32. The curved portion 14A of the transport chain 14 here forms a semicircle.

The transport chain 14 also comprises a downstream rectilinear portion or downstream strand 14B which is positioned tangentially to the drive wheel 32 downstream of the curved portion 14A in the anticlockwise direction of rotation of the transport chain 14.

The transport chain 14 also comprises an upstream rectilinear portion or upstream strand 14C which is positioned tangentially to the drive wheel upstream of the curved portion 14A in the anticlockwise direction of rotation of the transport chain 14.

The transport chain 14 is able to transport in turn each preform 12 carried by a mandrel 28 from an input point "P1" where the preform 12 is taken by the mandrel 28, to an output point "P2" where the preform 12 is released from the mandrel 28, along a transport path, passing through at least one heating area (not represented).

In order for the predetermined pitch "S" between the mandrels 28 to be the same all along the transport chain 14, both on the rectilinear strands 14B, 14C and on the curved portion, the axis "C" of the mandrels and the axis "B" of the hinges follow a single common path along the chain.

The loading device 10 comprises means of supplying preforms 12 which are intended to route the preforms 12 one after the other to the transport chain 14 via means of distributing preforms 12 to the grasping members 28 which will be described in more detail hereinafter.

The supply means in this case comprise a guideway 36 and an input transfer wheel 38 which is mounted to rotate about its vertical central axis "E".

The input transfer wheel 38 comprises notches 40 for receiving necks 20 of the preforms 12 which are spaced apart from each other circumferentially by the predetermined pitch "S". These notches 40 are able to receive the necks 20 of the preforms 12 arriving via the guideway 36 and to support the preforms 12 using their projecting collar 22 which bears on the edge of the notches 40.

Thus, the guideway 36 successively guides each preform 12 to the input transfer wheel 38 so as to distribute each preform 12 in an associated notch 40.

The notches 40 of the input transfer wheel 38 are here positioned at a height less than that of the mandrels 28 of the transport chain 14.

As represented in FIG. 1, in planar projection, the input transfer wheel 38 is here positioned tangentially to the curved portion 14A of the transport chain 14 at a first point of intersection "P3".

The input transfer wheel 38 is driven rotationwise about its axis "E" in a clockwise direction with reference to FIG. 1. The rotation speed of the input drive wheel 38 is synchronized with the rotation speed of the transport chain 14 so that a grasping member 28 and a notch 40 of the input transfer wheel 38 present themselves in synchronism at the first point of intersection "P3" in line with one another.

According to the teachings of the invention, the loading device 10 also comprises means of distributing preforms 12 which are in particular intended to maintain the preforms 12 during the grasping operation by the mandrels 28.

Figure 3:
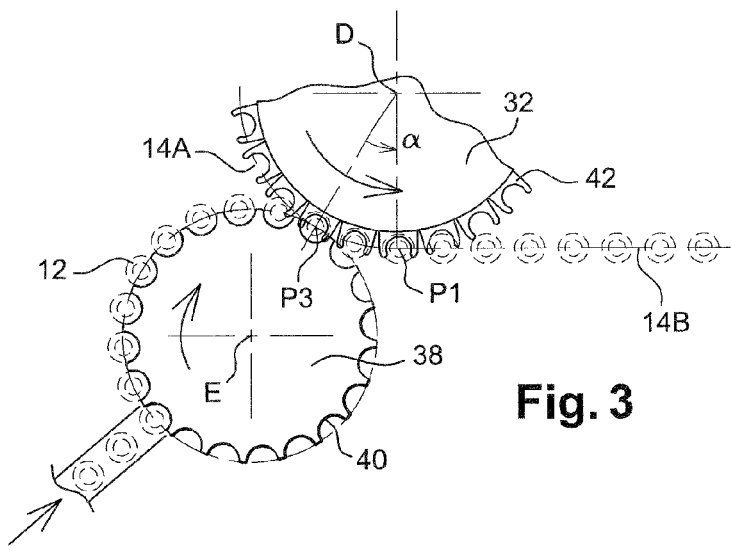
FIG. 3 is a view similar to that of FIG. 1 on a larger scale which represents an area for loading preforms onto the transport chain.

To this end, the drive wheel 32 comprises reception means 42 such as clamps as shown in FIG. 3. Here they are rigid clamps 42, the jaws of which, which are immobile relative to each other, delimit a recess of a shape complementing the shape of the neck 20 of each preform 12. Since the preforms 12 are made of an elastically deformable material, the neck 20 of the preform is elastically fitted reversibly between the jaws of the clamp 42.

According to a variant that is not represented of the invention, the clamps 42 have jaws which are articulated between a closed position and an open position, the jaws being returned elastically to their closed position.

According to a variant that is not represented of the invention, the clamps are carried by a plate of axis coaxial to the axis "D" of the drive wheel 32.

The clamps 42 are distributed over all the circumference of the drive wheel 32, roughly at the same height as the notches 40 of the input drive wheel 38. The clamps 42 are circumferentially spaced apart from each other by the predetermined pitch "S" so that a clamp 42 is axially positioned under each mandrel 28 of the curved portion 14A of the transport chain 14.

Thus, in planar projection, the circular path of the clamps 42 is superimposed on the path of the mandrels 28 all along the curved portion 14A of the transport chain 14. In other words, in planar projection, the path of the mandrels 28 is the same as the path of the clamps 42 all along the curved portion 14A of the transport chain 14.

As represented in FIG. 4, each clamp 42 is intended to catch a preform 12 on either side of the collar 22 so as to hold this preform during the operation for grasping the preform 12 by the mandrel 28.

Each jaw of the clamp 42 comprises a groove which extends radially relative to the axis "A" of the preform in the internal wall of the jaw in order to receive the collar 22. The preform 12 is thus supported by the horizontal bottom wall of the groove. The horizontal top wall of the groove immobilizes the upward movements of the preform 12 relative to the clamp 42. Thus, when the collar 22 is received in the complementary groove of the clamp 42, the preform 12 is immobilized against vertical movement in both directions relative to the clamp 42.

Each clamp 42 passes the first point of intersection "P3" of the input transfer wheel 38 and of the transport chain 14, in synchronism with a notch 40 of the input transfer wheel 38. Since the clamps 42 are positioned substantially at the same height as the notch 40, the clamp 42 is able to catch the preform 12 on either side of the collar 22, carried by the notch 40. The preform 12 is thus transferred from the input transfer wheel 38 to the drive wheel 32.

When the preform 12 is caught by the clamp 42, it occupies a so-called grasping position in which the axis "A" of the preform 12 is coaxial to the axis "C" of the mandrels 28, the mandrels thus being arranged facing the neck 20 of the preform 12.

The first point of intersection "P3" is positioned on the curved portion 14A of the chain 14, upstream of the input point "P1" which is positioned on the curved portion 14A of the chain 14 downstream of the first point of intersection "P3", for example at the downstream end of the curved portion 14A. Thus, the grasping operation advantageously lasts for the time it takes for the clamp 42 to travel an angular segment "P3-P1" of angle "α".

The path of the preform 12 carried by the clamp 42 and that of the mandrel 28 are superimposed along the angular segment "P3-P1" which forms, in planar projection, a first line of intersection between the path of the mandrels 28 and that of the clamps 42.

Thus, between the first point of intersection "P3" and the start point "P1", the preform 12 is maintained by the clamp 42 in its grasping position at right angles to the mandrel 28.

According to another aspect of the invention, the operation for grasping the preform 12 by the mandrel 28 requires a vertical sliding movement of the preform 12 into the grasping position relative to the mandrel 28.

According to the teachings of the invention, the clamps 42 are advantageously mounted to slide vertically relative to the drive wheel 32 between a bottom transfer position in which the clamp 42 is positioned at the same height as the notches 40 of the input transfer wheel 38 and a top loading position in which the neck 20 of the preform 12 carried by the clamp 42 is at the same height as the mandrels 28 so that the mandrel 28 is fitted into the neck 20.

As represented in FIG. 4, the vertical sliding of each clamp 42 is here controlled by a cam system. Thus, each clamp has a control rod 44. A roller 46 is mounted to rotate at a free bottom end of the control rod 44 of each clamp 42.

The roller 46 is intended to cooperate with a cam path 47 which is here carried by the bottom surface of a grasping rail 48. The grasping rail 48 is fixed relative to the drive wheel 32, that is, the grasping rail 48 is not driven rotationwise by the drive wheel 32.

Furthermore, each clamp 42 is elastically returned to its top loading position by a return spring 50, so that it is not necessary to prolong the rail when the clamp 42 is in the top loading position.

The cam path 47 comprises a first upstream slope 52 which is intended to control the lowering of the clamp 42 to its bottom transfer position. The cam path 47 also comprises a second downstream slope 54 which is intended to control the raising of the clamp 42 to its top loading position.

The second upstream slope 54 here extends over at least a portion of the line of intersection corresponding to the angular segment of angle "α", so that the grasping operation can be performed for a long enough time to ensure a reliable fitting of the mandrel 28 inside the neck 20 of the preform 12.

According to yet another aspect of the invention represented in FIG. 5, the loading device 10 comprises means for ejecting a preform 12 when it is not correctly caught by the mandrel 28, for example when the preform 12 is likely to fall on its path along the transport chain 14.

In this case, the start point "P1" of the preforms is arranged upstream of the downstream end of the curved portion 14A of the transport chain 14, so that the clamps 42 are able to temporarily support the preforms 12 after they have been taken by the mandrel 28 to the end of the curved portion 14A of the transport chain 14.

To this end, the loading device 10 comprises a sensor (not represented) for detecting the preforms 12 that are incorrectly fitted. The sensor is arranged so as to detect a fitting fault when the clamp 42 is in the top loading position, that is, when the preform 12 is caught by the mandrel 28 and its neck 20 is still supported by the clamp 42.

The ejection means also comprise a second ejection rail 64 which comprises a downward slope so as to maintain the clamp 42 in the bottom transfer position against the force exerted by the return spring 50 when the preform 12 is incorrectly fitted.

In order to selectively engage the clamps 42 carrying a preform 12 that is incorrectly fitted to the ejection rail 64, the device 10 comprises a retractable switching rail 66 which is mounted to move between a retracted position in which it is not inserted in the path of the roller 46 so that the clamp 42 remains in the top grasping position, and an active position in which the retractable switching rail 66 is inserted into the path of the roller 46 so as to direct the roller 46 under the ejection rail 64 in order to lower the clamp 42 to its bottom transfer position.

When the retractable switching rail 66 is in the active position, the clamp 42 is returned to its bottom transfer position by the ejection rail 64 while separating the neck 20 from the mandrel 28.

The retractable switching rail 66 is in this case a portion of rail which is mounted to pivot relative to its upstream end.

According to a variant of the invention, the retractable switching rail 66 is a portion of rail that is mounted to slide vertically between a retracted top position and an active bottom position.

According to yet another variant of the invention, the retractable switching rail 66 is a portion of rail which is mounted to slide radially relative to the axis "D" of the drive wheel 32, between a retracted external lateral position and an active internal insertion position.

When the preform 12 that is incorrectly fitted or incorrectly held is once again in its bottom transfer position, it is released from the clamp 42 to leave the device 10 and the installation 14. The preform 12 is, for example, released from the clamp 42 when it is no longer located under the transport chain 14, after the paths of the clamps 42 and of the mandrels 28 have diverged.

To this end, the device comprises a first arm 68 which is inserted in the path of the neck 20 of the preform 12 when the latter has been switched to its bottom transfer position by the retractable switching rail 66. The arm 68 is here a plate which makes it possible to release the preform 12 from the grip of the clamp 42 by provoking the separation of the preform 12 from the clamp 42.

As represented in FIG. 1, the installation also comprises an unloading device 58 which is similar to the loading device 10. Thus, the unloading device 58 comprises an output transfer wheel 60 and an output guideway 62.

The output transfer wheel 60 is positioned at the same height as the input transfer wheel 38, and it comprises notches 40 identical to those of the input transfer wheel 38, and it is mounted to rotate in a clockwise direction about an axis "F" tangentially to the drive wheel 32 at a second point of intersection "P4".

The clamps 42 of the drive wheel 32 are able to catch the preforms 12 carried by the mandrels 28 at an arrival point "P2" which is here positioned at the upstream end of the curved portion 14A of the transport chain 14.

The rotation speed of the output transfer wheel 60 is also synchronized with the rotation speed of the drive wheel 32 so that a notch 40 of the output transfer wheel 60 passes in synchronism with a clamp 42 of the drive wheel 32 at the second point of intersection "P4" which is positioned downstream of the arrival point "P2".

In planar projection, the path of the clamps 42 and the path of the mandrels 28 are superimposed on a second line of intersection "P2-P4" which extends between the arrival point "P2" and the second point of intersection "P4".

The second point of intersection "P4" is more particularly positioned upstream of the first point of intersection "P3" relative to the direction of rotation of the drive wheel 32.

Thus, between the moment at which the preform 12 is caught at the point "P3" by a clamp 42 and the moment at which the preform is transferred to the output transfer wheel 60 at the second point of intersection "P4", the preform 12 is maintained by the clamp 42 in line with the associated mandrel 28.

In a releasing operation which extends along the second line of intersection "P2-P4", the preform 12 is released from the grip of the mandrel 28 by a progressive downward vertical sliding movement of the clamp 42 which begins substantially at the arrival point "P2" and which ends roughly at the second point of intersection "P4".

The unloading device 58 comprises a second arm (not represented) which is able to release the preform from the grip of the clamp 42.

Advantageously, the same clamps 42 are therefore used successively to maintain the preforms in the grasping position in the grasping operation, then in the releasing operation.

In the operation of such a heating installation, the preforms 12 are routed one behind the other by the guideway 36 to each notch 40 of the input transfer wheel 38. Then, the input transfer wheel transports each preform 12 to the first point of intersection "P3" with the transporting element 14.

A clamp 42 which is driven by the grasping rail to its bottom transfer position then automatically catches the preform 12 no as to maintain the preform 12 vertically under an associated mandrel 28 in the grasping position.

The preform 12 is then supported by the clamp 42, and it is joined rotationwise to the drive wheel 32.

The clamp 42 is then returned to its top grasping position by the return spring 50. The return of the clamp 42 to its top grasping position is guided progressively by the rolling of the roller 46 under the downstream slope 54 of the grasping rail 48. Thus, the grasping operation extends over the angular segment "P3-P1" of angle "α" all along the path of the preform 12 and the path of the mandrel 28 are superimposed, the preform 12 thus being maintained strictly vertically in line with the mandrel 28 by the clamp 42.

In the grasping operation, the clamp 42 progressively raises the preform 12 to the mandrel 28 from its bottom position at the first point of intersection "P3" until the mandrel 28 is fitted in the neck 20 of the preform 12 when the preform 12 reaches the input point "P1" of the path of the mandrel 28.

When the path of the mandrel 28 and the path of the clamp 42 diverge, the preform 12 is automatically released from the clamp 42, the divergent movement of the preform 12 forcing the separation of the neck 20 from the clamp 42.

Then, the preform 12 is transported along its path to its output point "P2" which is positioned at the upstream end of the curved portion 14A of the transport chain 14. At this point, the preform 12 is caught by a clamp 42 in the top grasping position.

In planar projection, the clamp 42 has a path "P2-P4" which is common and tangential to the path of the mandrel 28 so that the clamp 42 is in line with the mandrel 28 at least from the output point "P2" at which the preform 12 is caught by the clamp 42, to the second point of intersection "P4" at which the preform 12 is transferred to the output transfer wheel 60.

Then, the clamp 42 is driven to its bottom position by a releasing rail (not represented) similar to the grasping rail 48. The clamp 42 bears on the collar 22 so as to separate the mandrel 28 from the neck 20 of the preform 12. The preform 12 is thus released from the grip of the mandrel 28.

The preform 12 is lowered to a transfer position in which the collar 22 of the preform 12 is positioned at the same height as the notches 40 of the output transfer wheel 60.

The preform 12 arrives in the transfer position at the second point of intersection "P4" in synchronism with a notch 40 of the output transfer wheel 60 so that the preform 12 is transferred to the notch 40 of the transfer wheel 60.

To this end, the preform 12 is released from the clamp 42 at the second point of intersection "P4" by means of the second arm or of an automatic control system.

The invention claimed is:

1. A device for loading (10) or unloading (58) containers (12) comprising a neck (20), and in particular preforms made of thermoplastic material, onto a transporting element (14) which comprises at least one individual member (28) for grasping a preform (12) by its neck (20), and which is able to transport the preform (12) along a horizontal transport path, the loading (10) or unloading (58) device comprising:

means of distributing (32, 42) the preforms (12) which comprise individual reception means (42) for each preform (12) so as to lead each preform (12) in turn along a distribution path in such a way that the path of the reception means (42) and the path of the grasping members (28), in planar projection, are tangential at at least one point of intersection (P3, P4) in which the preform (12) occupies a grasping position in which the neck (20) of the preform (12) is positioned vertically with respect to the grasping member (28), means for synchronizing the movement of the reception means (42) relative to the movement of the grasping member (28) so that the grasping member (28) is able to catch or release the neck (20) of the preform (12) by vertically sliding the preform (12) into the grasping position relative to the grasping member (28) in an operation to grasp or release the preform that occurs at said at least one point of intersection (P3, P4) of the abovementioned paths, characterized in that the path of the reception means (42) and the path of the grasping members (28) in planar projection are superimposed and synchronized along at least one line of intersection (P3-P1, P2-P4) so that the preform (12) is held in its grasping position all along the line of intersection (P3-P1, P2-P4), and in that the path of the grasping members (28) along the line of intersection (P3-P1, P2-P4) is circular about a driving vertical rotation axis (D), the reception means (42) being positioned at the periphery of a rotating plate (32), the rotation axis (D) of which corresponds to said driving vertical rotation axis.

2. The device for loading (10) or unloading (58) as claimed in claim 1, characterized in that the grasping members (28) are mounted to slide vertically relative to the preform (12) between a top grasping position and a bottom transfer position.

3. The device for loading (10) or unloading (28) as claimed in claim 2, characterized in that it comprises means (46, 48) of controlling the sliding of the reception means (42) relative to the grasping member so that the sliding of the reception means (42) relative to the associated grasping member from one position to the other is performed progressively all along the line of intersection (P3-P1, P2-P4).

4. The device for loading (10) or unloading (58) as claimed in claim 2, characterized in that the transporting element is an endless chain (14), a curved portion (14A) of which is wound around a drive wheel (32), and in that the plate is formed by the drive wheel (32).

5. The device for loading (10) or unloading (58) as claimed in claim 2, characterized in that the reception means are clamps (42) which are able to catch the container (12) by its neck (20) by reversible elastic fitting of the preform (12) in the clamp (42).

6. The loading device (10) as claimed in claim 2, which comprises means for ejecting preforms (12) which are incorrectly held by the grasping members, characterized in that the ejection means comprise means for selectively controlling the operation to release the incorrectly held preforms (12) relative to the grasping member (28), the incorrectly held preforms (12) being selectively released from the grasp of the grasping member (28) on a downstream section of the line of intersection (P3-P1) while being held by the reception means (42).

7. The device for loading (10) or unloading (28) as claimed in claim 1, characterized in that the reception means (42) of the preforms (12) are mounted to slide vertically so as to slide the preforms (12) between a bottom transfer position in which the preform (12) is released from the grasping member (28) and a top grasping position in which the preform (12) is caught by the grasping member (28).

8. The device for loading (10) or unloading (28) as claimed in claim 1, characterized in that it comprises means (46, 48) of controlling the sliding of the reception means (42) relative to the grasping member so that the sliding of the reception means (42) relative to the associated grasping member from one position to the other is performed progressively all along the line of intersection (P3-P1, P2-P4).

9. The device for loading (10) or unloading (58) as claimed in claim 1, characterized in that the transporting element is an endless chain (14), a curved portion (14A) of which is wound around a drive wheel (32), and in that the plate is formed by the drive wheel (32).

10. The device for loading (10) or unloading (58) as claimed in claim 1, characterized in that the reception means are clamps (42) which are able to catch the container (12) by its neck (20) by reversible elastic fitting of the preform (12) in the clamp (42).

11. The loading device (10) as claimed in claim 1, which comprises means for ejecting preforms (12) which are incorrectly held by the grasping members, characterized in that the ejection means comprise means for selectively controlling the operation to release the incorrectly held preforms (12) relative to the grasping member (28), the incorrectly held preforms (12) being selectively released from the grasp of the grasping member (28) on a downstream section of the line of intersection (P3-P1) while being held by the reception means (42).

12. The loading device (10) as claimed in claim 11, characterized in that the ejection means comprise means (68) for dropping the incorrectly held preforms (12) which are in the bottom transfer position after the releasing operation.

13. The loading device (10) as claimed in claim 12, characterized in that the ejection means comprise an arm (68) which is inserted into the path of the body (16) of the preforms (12) in the bottom transfer position after the releasing operation.

* * * * *